Patented June 14, 1932

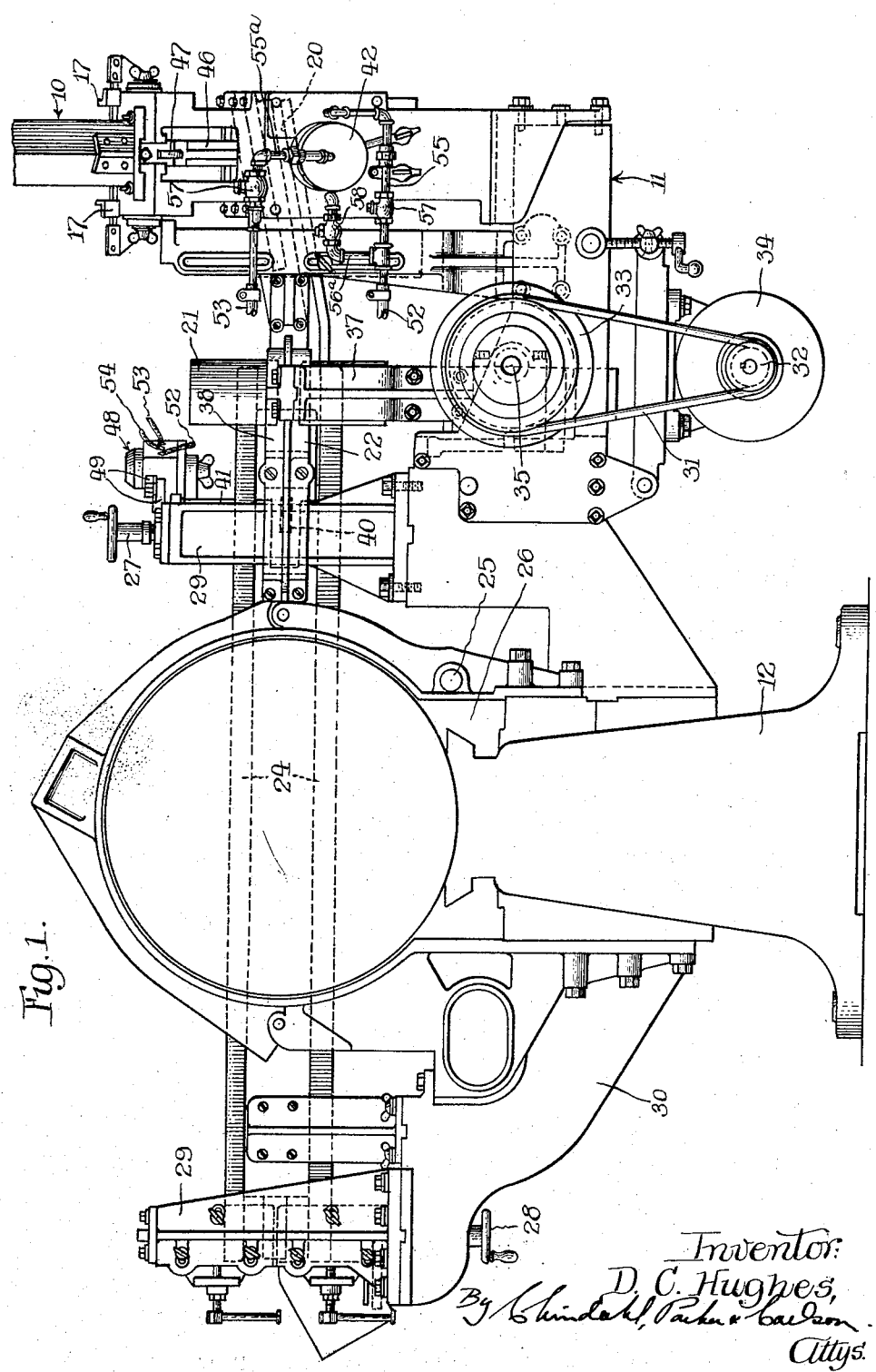

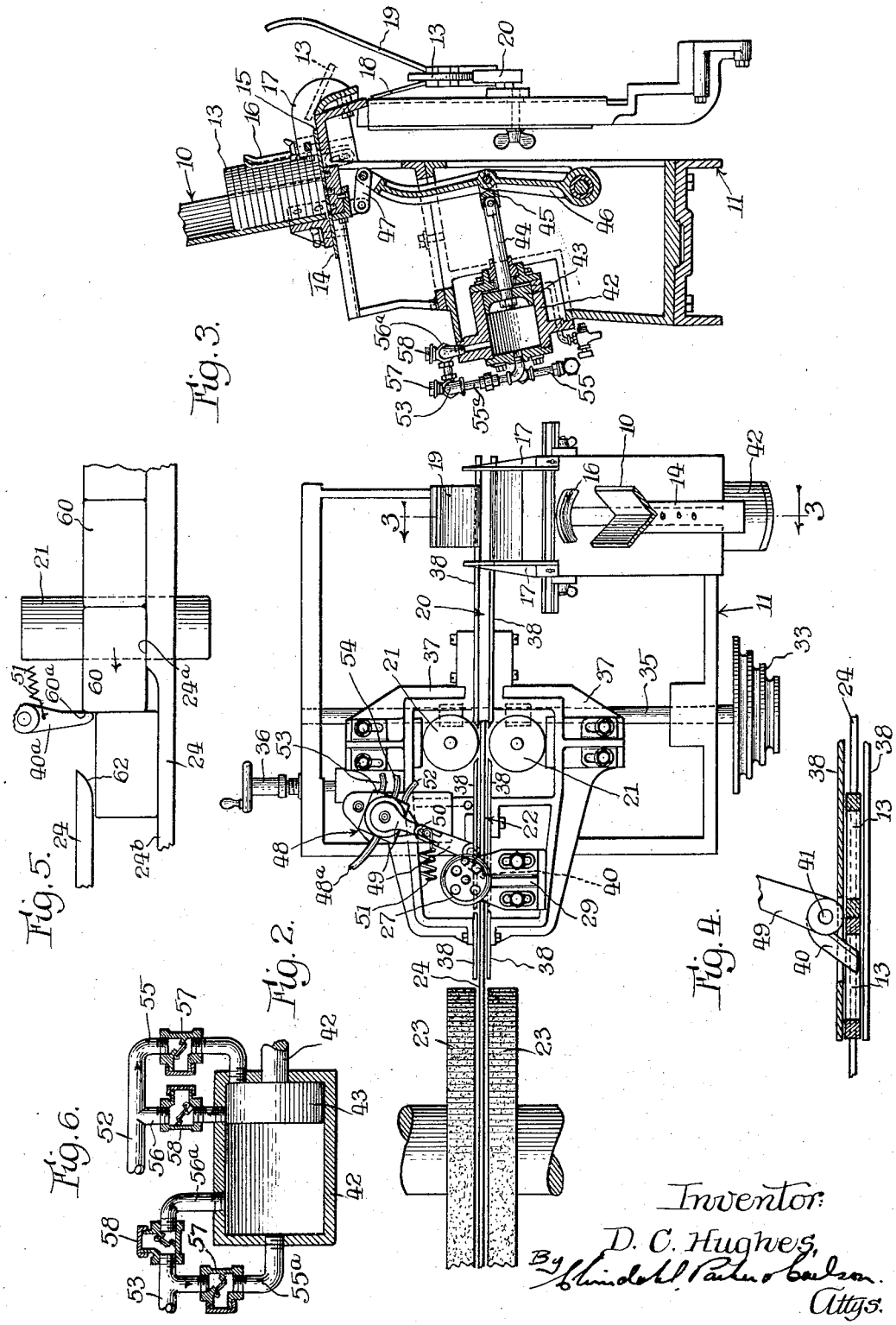

1,862,894

UNITED STATES PATENT OFFICE

DAVYDD C. HUGHES, OF BELOIT, WISCONSIN, ASSIGNOR TO GARDNER MACHINE COMPANY, OF BELOIT, WISCONSIN, A CORPORATION OF ILLINOIS

WORK FEEDING DEVICE

Application filed January 2, 1931. Serial No. 506,027.

The invention relates generally to work feeding devices and more particularly it relates to such devices for feeding work pieces automatically from a supply hopper to a machine so that an operation may be performed thereon by the machine.

Such machines usually embody a work advancing means which moves the work into operative relation to a tool, together with a hopper feed mechanism for supplying work pieces one by one to the advancing means; and it has been found that the accuracy of the finished work as well as the production efficiency of the machine are dependent upon accurate coordination of the hopper feed mechanism with the movement of the work by the advancing means.

An example of this situation is found in machines for grinding the parallel sides of piston rings, clutch disks and the like, wherein driven feed rolls are employed to advance the work pieces in edge to edge relation along a guideway which extends between the opposed faces of two parallel grinding disks. In such machines the work pieces are fed one by one from a hopper to the feed rolls, and provision is made for adjusting the rate of movement of the feed rolls to take care of variations in the type and amount of work to be performed by the grinding disks.

To produce accurately dimensioned work at the maximum rate, the work pieces must be maintained in contact with the grinding disks for an accurately determined length of time, which result is usually accomplished by moving the work pieces continuously and at a uniform rate along the guideway between the grinding disks by means of feed rolls. Hence the work pieces must be fed in continuous edge to edge relation to the feed rolls at a rate which is equal to the rate at which the work pieces are moved past the grinding disks.

Hopper feed devices acting by frictional contact with the work, often fail to eject work pieces at the proper rate, leaving gaps between the pieces which cause movement of the five or more work pieces between the grinding disks to be stopped, and while the work pieces remain stationary, they are ground too thin and are therefore spoiled.

Feeding mechanisms which grip the work positively have been continuously driven, and to take care of various sizes of work, such mechanisms have required accurate adjustment which increased the time required for the setting-up operation. In machines for grinding piston rings, there is a wide variation in the feeding rate due to the great variety of rings which must be finished. Thus during the day, a machine may be used to grind rings varying in size between Diesel engine rings and motor cycle rings, and in changing the set-up of the machine the hopper feed mechanism must be adjusted to compensate for changes in the speed of the feed rolls as well as for the changes in the diameter of the rings.

An important object, therefore, of the present invention is to provide for machines of this character, a feed mechanism which is positive in its operation and is arranged automatically to vary its feeding action in accordance with the size of the work pieces and the action of the work advancing means.

Another object is to provide a new and improved positively acting feed mechanism arranged to feed the work to the machine under the control of the work previously fed thereto.

Another object is to provide a machine having work advancing means for moving a series of work pieces through the machine along a definite path and past a tool, and a hopper feed mechanism operable to feed the work pieces one by one to the advancing means, together with control means for the hopper feed mechanism operable to cause feeding of one work piece to the work advancing means each time a work piece passes a predetermined point on its path of movement through the machine.

In machines for grinding the sides of a continuously moving succession of articles such as piston rings, the rings are forced through a guide by means such as driven feed rolls; and another object is to provide a hopper feed for machines of this type having a control element extending into the guide in a position to be actuated and moved by contact of one of the forwardly facing surfaces of the rings.

Another object is to provide such a machine having a hopper feed and a movable control element therefor, together with feed rolls and a guideway arranged to shift the position of the work slightly laterally of its path of movement after it has passed the feed rolls so that a forwardly facing exposed end surface will be provided for engaging the control element even though the work is of solid rectangular form.

Another object is to provide a new and improved hopper feed mechanism operated by pressure fluid and embodying simple means to cushion the movement of the parts.

Other objects and advantages will become apparent from the following description taken in connection with the accompanying drawings, in which:

Figure 1 is an end elevational view of a grinding machine having feeding mechanism embodying the invention in its preferred form.

Fig. 2 is a fragmental plan view of the feeding mechanism shown in Fig. 1.

Fig. 3 is a vertical sectional view taken along the line 3—3 of Fig. 2.

Fig. 4 is an enlarged portion of Fig. 2 taken partially in section, and showing the relation of the control member to the work pieces in the machine.

Fig. 5 shows an enlarged fragmental portion of the machine embodying an alternative form of the invention adapted for use with work pieces of a different form.

Fig. 6 is a diagrammatic view of the pressure fluid connections to the actuating cylinder.

For purposes of disclosure, the preferred form of the invention and one alternative form thereof are illustrated in the drawings and will hereinafter be described in detail as applied to a grinding machine of a particular form, but it is to be understood that this disclosure is not intended as a limitation of the invention to this type of machine nor to the particular forms of control mechanism, it being contemplated that various changes might be made by those skilled in the art to adapt the invention to other types of machines without departing from the spirit and scope of the invention as defined by the appended claims.

The form of the invention chosen for disclosure is applied to a double face grinding machine, and, considered generally, it is arranged so that the work pieces are fed one by one from a hopper to an inclined guideway by means of a reciprocable ejector, and passing down the guideway in edge to edge relation to a pair of driven feed rolls positioned on opposite sides of the guideway, the work pieces are forced on through the guideway and between the grinding disks by the action of the feed rolls. To insure in uninterrupted supply of work pieces to the feed rolls, regardless of the size and shape of the work, the operation of the ejector is controlled by a control element positioned in the path of the work pieces between the feed rolls and the grinding disks, whereby to cause actuation of the ejector each time a work piece passes and actuates the control element.

Referring more particularly to the drawings, the preferred form of the invention comprises a hopper 10 positioned substantially vertically upon a frame 11 extending laterally from one side of a grinding machine bed 12, and work pieces such as piston rings 13 (Fig. 3) stacked in the hopper, are discharged one by one from the bottom of the hopper by a slide or ejector 14 movable across the lower end of the hopper. The abutment 15 formed by the forward end of the ejector 14 moves the lower one of the work pieces 13 beneath the elevated lower edge of a retaining member 16 which forms the forward side of the hopper, and the ejected work piece is guided by transversely adjustable guides 17. Upon discharge laterally from the hopper the work piece 13 falls downwardly between upstanding guides 18 and 19, as indicated in Fig. 3, into vertical position in an adjustable, inclined guideway or track 20 also supported on the frame 11 and sloping downwardly toward the bed 12 of the machine.

At the lower end of the inclined guideway 20, a pair of oppositely driven feed rolls 21 (Figs. 1 and 2) are positioned to grip the work pieces 13 as they roll down the guideway 20 and force them through a guideway 22 leading to the space between two parallel driven grinding disks 23 mounted on the bed in coaxial relation. As the work pieces are moved through the space between the grinding disks 23 they are guided between two vertically spaced rails 24 which form a continuation of the guideway 22 and permit the opposite faces of the work to be ground by the disks, and at the other side of the machine the finished work pieces are dropped from the guide formed by the rails 24 into a suitable receptacle provided therefor.

To provide for various sizes of work the grinding disks 23 are simultaneously adjustable toward and away from each other by conventional means including a screw shaft 25 which moves a pair of housings 26 (Fig. 1) in which the grinding disks are mounted. Transverse or vertical adjustment of the guide rails 22 is obtained by adjusting screws 27 and 28 which support the opposite ends of the rails 22 on standards 29 secured on the frame 11 and on a similar frame 30 projecting from the other side of the machine bed. The speed of the feed rolls 21 may also be varied by shifting a belt 31 connecting cone pulleys 32 and 33 mounted respectively on the shaft of a motor 34 (Fig. 1) and on a horizontal shaft 35 which drives the rolls 21. For various thicknesses of work, the rolls 21 may be transversely adjusted by means including a screw 36 engaging two sliding frames 37 (Fig. 2) upon which the rolls 21 are mounted. This adjustment is arranged also to vary the width of the guideways 20 and 22, the side members 38 of which are carried on the sliding frames 37 as shown in Fig. 2.

In accordance with the present invention, the feeding action of the ejector 14 is arranged to conform automatically to the movement of the work pieces 13 through the machine and to this end it is governed by a movable control member 40 (Figs. 1, 2 and 4) projecting horizontally through the guideway 22 intermediate the feed rolls 21 and the grinding disks 23. As shown in Fig. 1, the member 40 is located at substantially the center line of the guideway 22 and projects through the central opening of each work piece 13 (Figs. 2 and 4) as it passes through the guideway. Advancing movement of the work piece 13 brings its inner periphery into contact with the member 40 (Fig. 4) and pivots it about the axis of a vertical shaft 41 upon which it is mounted.

Actuation of the ejector 14 under the control of the member 40 is preferably obtained by pressure fluid operated means such as a double acting piston and cylinder device having its cylinder 42 mounted on the frame 11 beneath the hopper 10. The piston 43 has a piston rod 44 (Fig. 3) upon the projecting end of which a link 45 is pivoted so as to connect the piston to a vertically positioned lever 46. The lever 46 is pivoted at its lower end to the frame 11 and is connected at its upper end to the ejector 14 by means of a link 47. Thus, movement of the piston is transmitted to the ejector 14. Each time the member 40 is actuated, the piston 43 and the ejector 14 are reciprocated due to movement of a conventional two-way valve 48 which is connected to the control member 40 and governs the supply of pressure fluid from a pipe 48ª to the cylinder 42.

The valve 48 is mounted for movement about a vertical axis above and to one side of the member 40 and is operatively connected to the member 40 by arms 49 fixed respectively on the movable member of the valve 48 and on the upper end of a shaft 41, and connected by a pin and slot connection 50. The valve 48 is normally held in one position by a spring 51 (Fig. 2) acting between a stationary part of the machine and one of the arms 49 and in this position it admits pressure fluid to a flexible conduit 52 which communicates with one end of the cylinder 42 so as to maintain the ejector 14 in its withdrawn position as shown in Fig. 2. When the valve is shifted to its other position by clockwise movement of the control member 40, it permits pressure fluid to pass through another flexible conduit 53 to the other end of the cylinder 42 to advance the ejector 14 to the position shown in Fig. 3, and force the lower one of the work pieces from the hopper. Provision is made in the valve 48 in a conventional manner including an exhaust connection 54, for selectively exhausting each end of the cylinder 42 through its conduit 52 or 53 when the other end of the cylinder is supplied with pressure fluid.

As soon as the abutting portions of the two adjacent work pieces 13 have passed the member 40 (Fig. 4), it is released for return by the spring 51 and is moved back to its position wherein it projects through the guideway 22 and the next one of the work pieces 13.

Such return of the member 40 and the valve 48 to their initial positions causes pressure fluid to pass to the other end of the cylinder 42 so as to retract the ejector 14. The work pieces in the hopper 10 then move downwardly until the lower one is positioned in the path of the abutment 15 of the ejector 14 and the device is ready for another feeding operation.

To cushion the movement of the piston 43 and the associated parts, each of the conduits 52, 53 has two similar branches 55 and 55ª and 56 and 56ª communicating with the cylinder 42. The branches 55 and 55ª each open into one end wall of the cylinder as shown in Fig. 6 and constitute inlet openings for the pressure fluid, while their associated branches 56 and 56ª each communicate with the cylinder at a point spaced a short distance from the corresponding end wall and constitute outlets for the pressure fluid. In each of the inlet branches 55 and 55ª, a check valve 57 acts to permit the flow of pressure fluid to the cylinder but to prevent discharge of the fluid through the branches 55 and 55ª. Check valves 58 in each of the outlet branches 56 are oppositely disposed and prevent passage of fluid to the cylinder through those branches. Thus, when the piston is moved to exhaust the left hand end of the cylinder (Fig. 6), the branch 55ª of that end of the cylinder is closed by its check valve 57 and the pressure fluid is discharged through the branch 56ª. When the piston has closed the end of the branch 56ª, the pressure fluid between the piston 43 and the end of the cylinder is trapped and forms a cushion which prevents jarring of the parts at the end of the piston stroke.

In Fig. 5 of the drawings an alternative form of the invention is illustrated which is intended for use with work pieces of solid or unapertured form wherein the adjacent end edges are complementary to each other. Rectangular work pieces 60, shown in Fig. 5, have these characteristics and to provide an exposed forwardly facing end surface for actuating the control member 40ª, means is provided for shifting the work pieces a slight distance laterally of their path. To this end, the lower guide rail 24 is widened between the rolls to provide an elevated surface 24ª along which the work pieces are moved by the rolls 21. After the work pieces pass the rolls, they drop downwardly onto the lowered surface 24ᵇ of the rail, whereby to expose the upper portion 60ª of the forward edge of the next work piece 60. The pivoted control member 40ª, in the present case, is pivoted on a horizontal axis and extends downwardly into the path of the portion 60ª of the end edge of the work piece and, as the work piece is advanced, the member 40ª is actuated. During such actuation, the lower portion of the forward edge of that work piece 60 contacts the preceding work piece and advances it through the guideway.

After the control member 40ª has been moved a short distance against its spring 51, it exerts a downward force on the actuating work piece 60, and as soon as that work piece has been released from between the feed rolls 21, the forward end of the work piece is moved downwardly by the combined action of gravity and control member 40ª. Thus, upon continued forward movement, the work piece moves beneath the sloping end surface 62 of the upper guide rail 24 and into the space between the two guide rails 24, the action of the surface 62 completing the downward movement of the work piece in case the forces exerted by gravity and the member 40ª have been insufficient.

In operation, the grinding disks 23, the feed rolls, the hopper, and the various guides are adjusted for operation upon a particular size of work, and the valve 48 is manually actuated until a number of work pieces 13 have been fed into the inclined guideway 20. These work pieces are advanced by the feed rolls 21 until the leading one actuates the control member 40. When such actuation takes place it is desirable to have a supply of two or three work pieces in the inclined guideway 20, and due to the actuation of the ejector 14, this supply of work in the guideway 20 will be replenished each time a work piece passes and actuates the member 40. Thus, a continuous supply of work pieces to the feed rolls is insured so long as the hopper 10 is kept filled.

From the foregoing, it will be apparent that the invention provides a work feeding mechanism which simplifies the setting up of the machine by automatically compensating for varying sizes of work pieces, insures a proper supply of work pieces to the machine at all times, and materially simplifies the construction of the machine.

I claim as my invention:

1. In a machine having a tool, means for advancing work pieces into operative relation to the tool, a hopper for containing a supply of work pieces, means for feeding such work pieces from said hopper to said advancing means one by one, and a control device for said feeding means operable when actuated to initiate feeding action of said feeding means and arranged to be actuated by the work pieces as they are moved by said advancing means.

2. A machine having a tool for operating on work pieces, means for advancing work pieces through the machine and past said tool in succession and along a definite path, a hopper for containing a supply of work pieces, a movable feeding member for positively engaging the work piece at one end of said hopper to eject it from the hopper, means for conveying the ejected work pieces to said advancing means, actuating means for said member, and a control element for said actuating means mounted along said path and operated by said work pieces as they move through the machine to cause actuation of said feeding member each time a work piece passes said control element.

3. In a machine having a tool for operating upon work pieces, a hopper for containing a supply of work pieces, means for discharging work pieces one at a time from the hopper, means arranged to receive such discharged work pieces and to convey the same to the tool, a control member adapted to be actuated by each work piece in its movement as it passes from the hopper to the tool, and power means controlled by said control member and connected to said discharging means to move said discharging means to discharge one work piece from the hopper each time said member is actuated.

4. In a machine having a tool for operating on work pieces, a supply hopper for work pieces, a movable member at one end of said hopper for engaging and discharging work pieces therefrom one at a time, means to receive such discharged work pieces and to convey them to the tool, an element located along the path of movement of the work pieces between the hopper and the tool and arranged to be actuated by each passing work piece, and means operatively connecting said element and said member arranged to move said member to discharge one work piece from the hopper each time said element is actuated.

5. In a machine having a guideway along which work pieces move through the machine, a hopper for containing a supply of work pieces, a movable feeding member arranged in its movement to positively engage the work piece at one end of the hopper and eject it into said guideway, a control element mounted along said guideway and actuated by each passing work piece, and actuating means controlled by said element and operable to move said feeding member to eject one work piece from the hopper each time said control element is actuated.

6. In a machine having a guideway along which work pieces move through the machine, a hopper feed device having a movable member operable to positively engage and move work pieces from said hopper to said guideway one at a time, and actuating means for said movable member operable intermittently under the control of the work pieces in said guideway.

7. In a machine having a guideway along which work pieces move through the machine, a hopper feed device having a reciprocable ejector operable to engage said work pieces positively and move them one at a time from said hopper to said guideway, and actuating means for reciprocating said ejector under the control of the work pieces in said guideway.

8. In a grinding machine having opposed driven grinding disks, transversely spaced guide rails extending therebetween, a pair of driven feed rolls, a guideway leading from one side of said feed rolls to the space between said guide rails, and an inclined chute leading to the other side of the feed rolls, the combination of a hopper for containing a supply of work pieces, a movable member having an abutment thereon for engaging the work piece at one end of the hopper to eject the work piece from the hopper into said chute, power means operable to impart such a work-ejecting movement to said member, and a control element for said power means positioned along said guideway and actuated by each work piece passing therethrough to cause a work-ejecting movement of said member.

9. In a machine having a guideway through which work pieces are moved in edge-to-edge abutment, a pair of opposed feed rolls at one end of the guideway operable to force the abutting work pieces through said guideway, an inclined chute at the other side of said rolls through which work pieces may move by gravity to the rolls, a hopper for containing a supply of work pieces, an ejector reciprocable across the end of said hopper and operable in each reciprocatory movement to discharge one work piece from the hopper into said chute, means operable to reciprocate said ejector, and a movable control element for said means arranged when actuated to cause one complete reciprocatory movement of said ejector, said element being positioned along said guideway and arranged to be actuated by each passing work piece.

10. In a machine having a tool for operating upon work pieces, a hopper for containing a supply of work pieces, an ejector slidable across one end of said hopper to eject the end work piece therefrom, means operable to convey the ejected work pieces along a definite path to said tool, a piston and cylinder device operatively connected to said ejector, a valve connected to one end of said cylinder for controlling the passage of pressure fluid thereto to cause movement of the ejector in one direction, means for causing movement in the other direction, and a control member operatively connected to said valve for shifting the same, said control member being mounted along said path in a position to be actuated once by each work piece passing along said path.

11. A machine having a tool for operating on work pieces, means for moving work pieces successively through the machine past said tool and along a definite path, an intermittently operable hopper feed mechanism for supplying work pieces one by one to said means, a control member for said mechanism pivoted laterally of said path on an axis transversely disposed with respect to said path, yielding means normally holding said member across said path in a position to be engaged and moved by each work piece passing along the path, and means operatively connecting said control member to said feed mechanism in controlling relation thereto.

12. In a machine of the character described, the combination of an intermittently operable hopper feed mechanism, a work advancing means to which work pieces are fed by said mechanism, a guideway through which said work pieces are forced in succession by said advancing means and in which each work piece is shifted slightly laterally at a predetermined point after it has passed said advancing means to expose a forwardly facing surface of the following work piece, and a movable control element for said feed mechanism normally extending into the path of such an exposed surface of the work piece for engagement and actuation thereby.

13. In a machine having a hopper feed mechanism, a pair of feed rolls to which work pieces are fed by said mechanism, a guide through which the work pieces are forced by said rolls, said guide having an elevated bottom surface between and for a short distance beyond the rolls, said elevated surface of the guide merging with a lower bottom surface of said guide, and a control member for said hopper feed mechanism positioned over said lower surface for engagement by each work piece as it is moved off of the end of said elevated bottom surface of the guide.

14. A machine of the character described having a guideway through which work pieces may be moved, said guideway being formed to permit slight lateral shifting of said work pieces at one point therein whereby to expose an advancing end surface of each work piece, and a yielding control member arranged to be engaged by such an exposed end surface of each work piece and acting to shift said work piece laterally in the guideway after actuation of the control member.

15. In a machine having an intermittently operable hopper feed mechanism, a guideway into which work pieces are fed by said mechanism, means for advancing the work pieces through the guideway, said guideway being arranged to shift each work piece laterally of the guideway at a given point therein, and a movable control member for said feed mechanism mounted adjacent said point for movement laterally with respect to the guide under the influence of the work pieces as they shift laterally in the guide.

16. In a machine of the character described the combination of a guideway having a bottom rail with an elevated bottom surface over which work pieces are moved, said rail also having a surface disposed at a lower level onto which work pieces are moved from said elevated surface, an upper guide rail forming a part of said guideway positioned above said lower bottom surface, said upper guide rail having an inclined surface arranged to be engaged by the moving work pieces to shift them downwardly into contact with said lower surface.

17. A feed device comprising a hopper, a reciprocable ejector for feeding work pieces from the hopper, a piston and cylinder device operatively connected to said ejector for actuating the same, a source of pressure fluid, a valve, a conduit from said valve to one end of said cylinder, said conduit having two branches, one of which opens through the end wall and has a check valve therein to prevent discharge of pressure fluid from the cylinder through said branch, and the other one of which opens into the side of the cylinder at a point spaced from said end wall, and a check valve in said last mentioned branch to prevent passage of pressure fluid into the cylinder through said branch.

18. A feed device comprising a hopper, a reciprocable ejector for feeding work pieces from the hopper, a piston and cylinder for actuating the ejector, a source of pressure fluid, a two-way valve, and means connecting said valve to opposite ends of the cylinder, each connection comprising a line having two branches one constituting an inlet connected to the cylinder through the end wall and the other constituting an outlet connected to the cylinder through the side wall at a point spaced from said end wall, a check valve in each inlet to prevent discharge of pressure fluid therethrough from the cylinder, and a check valve in each outlet to prevent passage of pressure fluid therethrough into the cylinder.

19. The combination of an intermittently operating positively acting work supply device, frictionally acting work advancing means to which work pieces are supplied by said device, and a control member actuated by each work piece after it has passed beyond the control of said device and operable when actuated to cause operation of said work supply device.

20. In a machine of the character described the combination of an intermittently operable positively acting work supply device, an impositively acting work advancing means to which work pieces are supplied by said device, and a control member actuated by each work piece in its movement by said work advancing means and operable when actuated to cause operation of said work supply device.

21. The combination of a machine having work-moving means, intermittently operable positively acting work supply means, and a control element actuated by the work in its movement by said work-moving means and operable when actuated to cause operation of said work supply means.

22. In a machine adapted to operate upon work pieces, the combination of a work supply device adapted to operate intermittently and positively, and a control member actuated by engagement with each work piece after it has passed beyond the control of said supply device and operable when actuated to initiate a work supplying operation of said device.

In testimony whereof, I have hereunto affixed my signature.

DAVYDD C. HUGHES.